United States Patent
Strohbehn et al.

(10) Patent No.: US 11,830,969 B1
(45) Date of Patent: Nov. 28, 2023

(54) INTERCONNECTING CURRENT COLLECTORS COMPRISING POLYMER BASES

(71) Applicant: Cuberg, Inc., San Leandro, CA (US)

(72) Inventors: Luke Strohbehn, Berkeley, CA (US); Katherine Hanus, San Francisco, CA (US); Raven Barnes, Piedmont, CA (US); Michelle Chen, Berkeley, CA (US); Edward Meyjes, Berkeley, CA (US)

(73) Assignee: Cuberg, Inc., San Leandro, CA (US)

( * ) Notice: Subject to any disclaimer, the term of this patent is extended or adjusted under 35 U.S.C. 154(b) by 0 days.

(21) Appl. No.: 18/160,923

(22) Filed: Jan. 27, 2023

(51) Int. Cl.
- *H01M 4/66* (2006.01)
- *H01M 4/62* (2006.01)
- *H01M 4/40* (2006.01)

(52) U.S. Cl.
CPC ........... *H01M 4/667* (2013.01); *H01M 4/405* (2013.01); *H01M 4/622* (2013.01); *H01M 4/661* (2013.01)

(58) Field of Classification Search
CPC .................................................. H01M 4/667
See application file for complete search history.

(56) References Cited

U.S. PATENT DOCUMENTS

| | | | |
|---|---|---|---|
| 11,158,860 B2 | 10/2021 | Morin et al. | |
| 2012/0315537 A1* | 12/2012 | Ravdel | H01M 4/667 29/623.5 |
| 2021/0167399 A1 | 6/2021 | Hu | |
| 2022/0131201 A1 | 4/2022 | Morin et al. | |

FOREIGN PATENT DOCUMENTS

CN 115133231 A * 9/2022

\* cited by examiner

*Primary Examiner* — Stephan J Essex
(74) *Attorney, Agent, or Firm* — Polygon IP, LLP (57) ABSTRACT

Described herein are electrochemical cells fabricated with current collectors comprising polymer bases and metal layers and methods of interconnecting these current collectors or, more specifically, interconnecting their metal layers. For example, a current collector, positioned between two other current collectors, can have an opening allowing these two other current collectors to form a direct interface. This interface not only directly interconnects the metal layers on these two current collectors but also indirectly interconnects the two metal layers of the middle current collector, which are positioned on the opposite sides of the polymer base of this current collector. In some examples, the metal layers of current collectors are reinforced by external metal foils that help to maintain continuity and/or repair any discontinuities in the metal layers when these metal layers are welded together. For example, welding may push portions of the polymer bases away from the weld zone.

17 Claims, 9 Drawing Sheets

INTERCONNECTING CURRENT COLLECTORS COMPRISING POLYMER BASES

BACKGROUND

Convention lithium-metal and lithium-ion cells utilize current collectors in a form of metal foils. For example, a positive electrode may be fabricated with an aluminum foil that supports one or two positive active material layers. The foil provides mechanical support and is operable as an electrical conductor between the positive active material layers and other components of the cell, e.g., an electrode tab that can be welded to the foil. While this conductivity is desirable (especially for high-rate applications), this constant conductivity can also result in potentially unsafe conditions. For example, lithium dendrite growth can cause a local short circuit. If the current is not cut to this short circuit, then a thermal event can develop leading to potentially more dangerous conditions.

One option for mitigating such shorts is to use a polymer base in a current collector. However, the polymer base interferes with processing the current collector, in particular with the ability to form electrical connections between the current collector and other components, such as electrode tabs. For example, various forms of welding (e.g., ultrasonic, resistance, and laser) that are conventionally used for interconnecting metal foils may not suitable when current collectors include polymer bases.

What is needed are new current methods and systems for interconnecting current collectors comprising polymer bases and metal layers for use in lithium-metal cells.

SUMMARY

Described herein are electrochemical cells fabricated with current collectors comprising polymer bases and metal layers and methods of interconnecting these current collectors or, more specifically, interconnecting their metal layers. For example, a current collector, positioned between two other current collectors, can have an opening allowing these two other current collectors to form a direct interface. This interface not only directly interconnects the metal layers on these two current collectors but also indirectly interconnects the two metal layers of the middle current collector, which are positioned on the opposite sides of the polymer base of this current collector. In some examples, the metal layers of current collectors are reinforced by external metal foils that help to maintain continuity and/or repair any discontinuities in the metal layers when these metal layers are welded together. For example, welding may push portions of the polymer bases away from the weld zone.

In some examples, an electrochemical cell comprises a plurality of active material layers and a plurality of current collectors, partially interfacing and supporting the plurality of active material layers and comprising a first current collector, a second current collector, and a third current collector that form a current collector stack away from the plurality of active material layers. The first current collector comprises a first metal layer, a first additional metal layer, and a first polymer base positioned between and supporting both the first metal layer and the first additional metal layer. The second current collector comprises a second metal layer, a second additional metal layer, and a second polymer base positioned between and supporting both the second metal layer and the second additional metal layer. The third current collector comprises a third metal layer, a third additional metal layer, and a third polymer base positioned between and supporting both the third metal layer and the third additional metal layer. The second current collector is positioned between the first current collector and the third current collector such that the first additional metal layer directly interfaces with the second metal layer and such that the second additional metal layer directly with interfaces the third metal layer. The second current collector comprises a second-collector contact opening with at least one of the first current collector and the third current collector protruding into the second-collector contact opening and forming a through-second-collector contact interface between the first additional metal layer and the third metal layer thereby indirectly interconnecting the second metal layer and the second additional metal layer.

In some examples, the through-second-collector contact interface is formed by welding the first additional metal layer and the third metal layer. In the same or other examples, both the first current collector and the third current collector protrude into the second-collector contact opening. In some examples, the second-collector contact opening has a width that is smaller than the thickness of the second current collector.

In some examples, the electrochemical cell further comprises a metal layer directly interfacing the first metal layer such that the first current collector is positioned between the metal layer and the second current collector. The first current collector comprises a first-collector contact opening with at least one of the metal layers and the second current collector protruding into the first-collector contact opening and forming a through-first-collector contact interface between the metal layer and the second metal layer thereby indirectly interconnecting the first metal layer and the first additional metal layer. In more specific examples, the metal layer is a standalone structure such that the surface of the metal layer facing away from the first current collector is at least partially exposed. For example, the metal layer is a tab extending away from the current collector stack and forming an external connection to the current collector stack. In some examples, the metal layer is a part of an additional current collector, forming the current collector stack together with the first current collector, the second current collector, and the third current collector.

In some examples, the first metal layer and the third additional metal layer are interconnected using a combination of a through-first-collector contact interface extending through a first-collector contact opening, the through-first-collector contact interface extending through the first-collector contact opening, and a through-third-collector contact interface extending through a third-collector contact opening.

In some examples, the electrochemical cell is a lithium metal cell. For example, each of the plurality of active material layers comprises lithium metal. In more specific examples, each of the first metal layer, the first additional metal layer, the second metal layer, the second additional metal layer, the third metal layer, and the third additional metal layer comprises copper. In some examples, each of the plurality of active material layers comprises positive active material structures and a polymer binder. For example, each of the first metal layer, the first additional metal layer, the second metal layer, the second additional metal layer, the third metal layer, and the third additional metal layer comprises aluminum.

In some examples, the thickness of each of the first metal layer and the first additional metal layer is at least 5 times smaller than the thickness of the first polymer base. For example, the thickness of each of the first metal layer and the first additional metal layer is less than 2 micrometers, while the thickness of the first polymer base is at least 5 micrometers.

In some examples, each of the first polymer base, the second polymer base, and the third polymer base comprises one or more of polyethylene terephthalate, polypropylene, polycarbonate, polyethylene, polyimide, ceramic-based polymer, cellulose, nylon, and a polyolefin.

Also provided is an electrochemical cell comprising a plurality of active material layers and a plurality of current collectors, partially interfacing and supporting the plurality of active material layers and comprising a first current collector and a second current collector that form a current collector stack away from the plurality of active material layers. The first current collector comprises a first metal layer, a first additional metal layer, and a first polymer base positioned between and supporting both the first metal layer and the first additional metal layer. The second current collector comprises a second metal layer, a second additional metal layer, and a second polymer base positioned between and supporting both the second metal layer and the second additional metal layer. The cell also comprises a plurality of metal sheets comprising a first metal sheet, a second metal sheet, and a third metal sheet. The first current collector is positioned between the first metal sheet and the second metal sheet such that the first metal layer directly interfaces with the first metal sheet and such that the first additional metal layer directly interfaces with the second metal sheet. The second current collector is positioned between the second metal sheet and the third metal sheet such that the second metal layer directly interfaces with the second metal sheet and such that the second additional metal layer directly interfaces with the third metal sheet. The first metal sheet, the first metal layer, the first additional metal layer, the second metal sheet, the second metal layer, the second additional metal layer, and the third metal sheet form an interconnected stack such that the first polymer base and the second polymer base do not extend through the interconnected stack.

In some examples, the first metal layer directly interfaces with the first additional metal layer in the interconnected stack, while the second metal layer directly interfaces with the second additional metal layer in the interconnected stack. In the same or other examples, the first metal sheet, the first metal layer, the first additional metal layer, the second metal sheet, the second metal layer, the second additional metal layer, and the third metal sheet are welded together in the interconnected stack.

These and other embodiments are described further below with reference to the figures.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

As noted above, a polymer base can be used as a part of a current collector to mitigate local shorts. Specifically, polymer bases can be operable as fuses, isolating specific areas in an electrode that have experienced short circuits, while the rest of the electrode continues to function. This functionality may be referred to as localized electrode fusing. An additional benefit of polymer bases (instead of metal foils) is weight saving. Specifically, metals are substantially heavier than polymers as shown in the following table comparing the specific gravities of different materials.

| Material | Specific Gravity |
| --- | --- |
| Aluminum | 2.55-2.80 |
| Copper | 8.8-8.95 |
| Nickel | 8.91 |
| Polyethylene Terephthalate (PET) | 1.34 |
| Polypropylene | 0.90-0.96 |
| Polycarbonate | 1.19 |
| Polyimide | 1.42 |
| Cellulose | 0.33 |
| Nylon | 1.14 |
| Polyolefin | 0.92-0.94 |

As such, replacing most or all metal current collectors with polymer bases provides substantial weight savings thereby potentially increasing the gravimetric capacity of an electrochemical cell as well as improving cell safety. However, forming electrical connections (e.g., by welding) to a current collector comprising a polymer base or, more specifically, interconnecting multiple stacked current collectors can be challenging. The polymer base interferes with forming a metal weld nugget by being closely positioned to the weld zone or even being positioned along the path of weld tools.

Figure 1A:
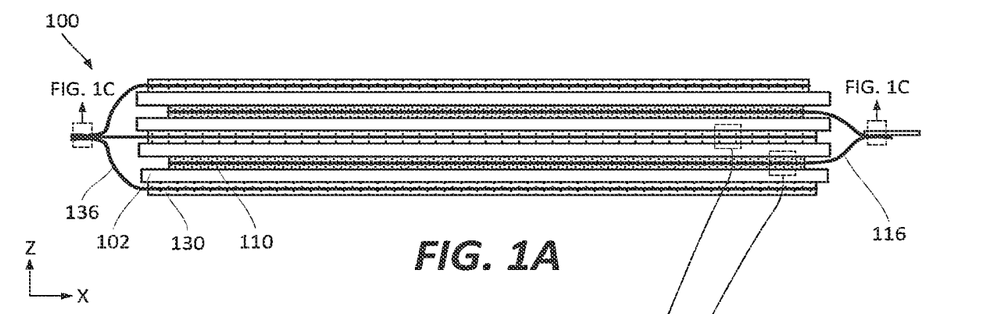
FIG. 1A is a schematic cross-sectional side view of an electrochemical cell formed by stacking positive and negative electrodes and interconnecting their respective metal grids, in accordance with some examples.

FIG. 1A is a schematic cross-sectional side view of electrochemical cell 100 formed by stacking positive electrodes 110 and negative electrodes 130, in accordance with some examples. Separator 102 is positioned between each adjacent pair of positive electrodes 110 and negative electrodes 130 and provides electronic isolation while enabling ionic transport. Specifically, each positive electrode 110 comprises positive-electrode current collector 116, while each negative electrode 130 comprises negative-electrode current collector 116. In some examples, both positive-electrode current collector 116 and negative-electrode current collector 136 comprise polymer bases. Alternatively, only one type of current collector (e.g., positive-electrode current collector 116 or negative-electrode current collector 116) comprises polymer bases. The other type can be a solid metal foil without any polymer components. In either case, positive-electrode current collectors 116 and, separately, negative-electrode current collectors 136 need to be interconnected.

Figure 1B:
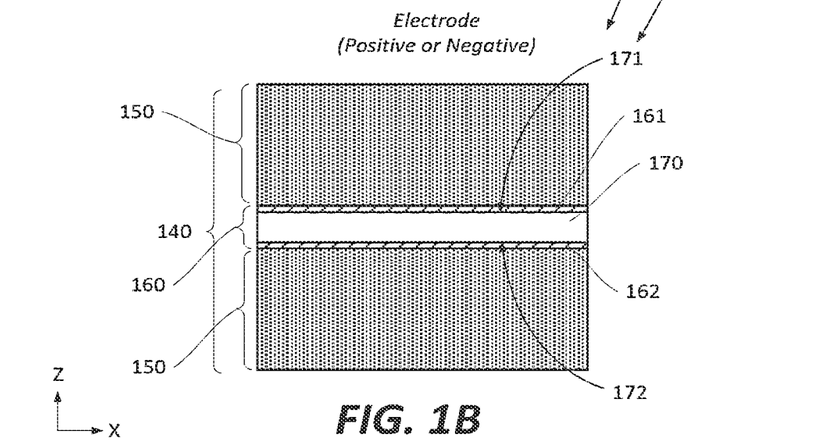
FIG. 1B is a schematic cross-sectional view of an electrode illustrating different electrode components, in accordance with some examples.

FIG. 113 is a schematic cross-sectional view of electrode 140 illustrating different electrode components, in accordance with some examples. Electrode 140 can represent one or both positive electrodes 110 and negative electrodes 130. Specifically, electrode 140 comprises two active material layers 150 and current collector 160, which is positioned between these active material layers. Specifically, current collector 160 partially interfaces and supports each active material layer 150. FIG. 113 illustrates two active material layers 150 with current collector 160 positioned in between these two active material layers 150. Such electrode 140 may be referred to as a two-sided electrode. One having ordinary skills in the art would appreciate that some electrodes can have only one active material layer 150 covering only one side of current collector 160. The other side of current collector 160 does not interface with any active material layers and can be exposed.

Current collector 160 comprises polymer base 170, metal layer 161, and additional metal layer 162. Polymer base 170 is positioned between metal layer 161 and additional metal layer 162 thereby isolating these layers from each other. The thickness of polymer base 170 can be at least 5 micrometers or, more specifically, at least 10 micrometers. Metal layer 161 and additional metal layer 162 are positioned between and directly interface both polymer base 170 corresponding active material layers 150. Metal layer 161 and additional metal layer 162 assist with electronic conductivity between active material layers 150 and various other components of the battery (e.g., tabs). In some examples, when the material of active material layer 150 is sufficiently conductive (e.g., lithium metal), active material layer 150 and the corresponding metal layer can have the same composition and form the same monolithic structure. A portion of this structure can be used as an active material layer (e.g., a portion of lithium metal that is transferred to the positive electrode during the discharge) and another portion remains as a metal layer. The remaining metal layer effectively serves as a seed for the later deposition of the active material layer (e.g., lithium) during the battery charge.

In some examples, metal layer 161 and/or additional metal layer 162 has a thickness smaller than the thickness of polymer base 170, e.g., at least 2 times smaller, 5 times smaller, or even 10 times smaller. As such, polymer base 170 can provide the bulk of mechanical support to current collector 160.

For example, the thickness of metal layer 161 and/or additional metal layer 162 is less than 5 micrometers, less than 2 micrometers, or even less than 1 micrometer. The thickness of metal layer 161 and/or additional metal layer 162 can be selected based on the electronic conductivity of the materials forming the metal layer, the metal layer size (the electron travel distance), and the current carrying capabilities required from the metal layer (e.g., thicker metal layers for higher-current applications).

In the same other examples, the thickness of polymer base 170 is at least 5 micrometers, at least about 10 micrometers, or even at least about 15 micrometers. This thickness depends on the material of polymer base 170, the required mechanical support capabilities required from polymer base 170, and the required short-circuit fusing capabilities of polymer base 170.

In some examples, polymer base 170 comprises one or more polyethylene terephthalate, polypropylene, polycarbonate, polyethylene, polyimide (e.g., KAPTON®), ceramic-based polymer, cellulose, nylon, and various polyolefins. A material for polymer base 170 can be selected to ensure shrinkage during heating (e.g., during a local short), which pulls the corresponding portion of metal layer 161 (supported by polymer base 170) from that local short. In other words, in some examples, the material of polymer base 170 shrinks upon heating.

Figure 1C:
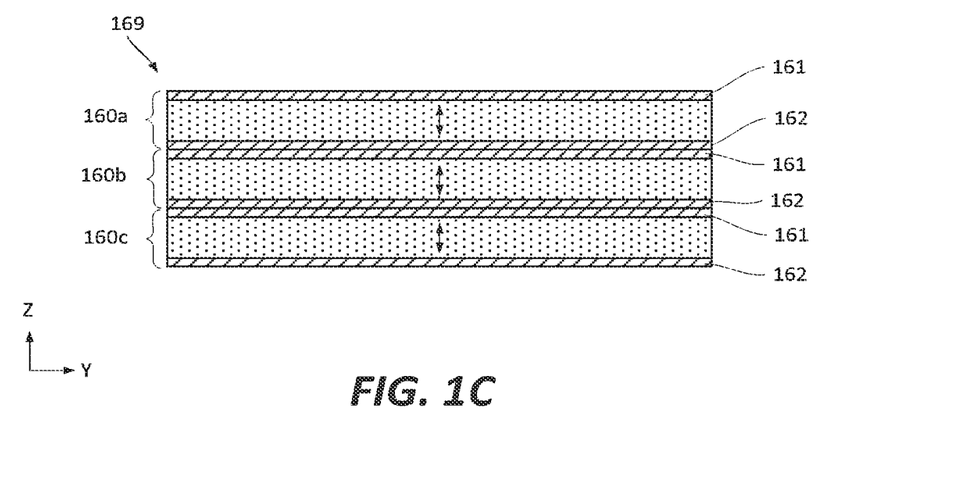
FIG. 1C is a schematic cross-sectional view of a stack formed by current collectors, each comprising a metal layer, an additional metal layer, and a polymer base positioned between and supporting both the metal layer and the additional metal layer, in accordance with some examples.

Referring to FIG. 1C, when multiple current collectors (e.g., first current collector 160a, second current collector 160b, and third current collector 160c) are stacked together only metal layers, which directly interface with each other, are interconnected. However, in some examples, additional metal layers need to be interconnected. For example, all metal layers may need to be interconnected. Various metal-layer interconnection examples will now be described with reference to FIGS. 2A-4B.

Interconnected Stack Examples

Figure 2A:
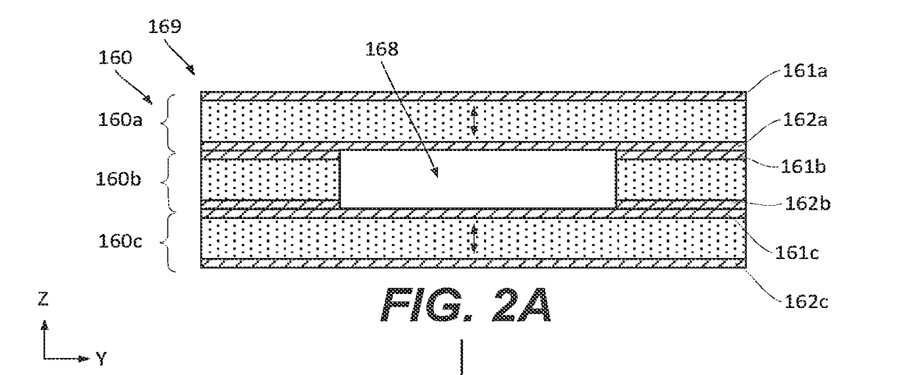
FIG. 2A is a schematic cross-sectional side view of the stack formed by three current collectors before interconnecting some of the metal layers of these current collectors, in accordance with some examples.

FIG. 2A illustrates current collector stack 169 formed by plurality of current collectors 160. Specifically, the illustrated portions of current collectors 160 are free from active material layers 150. However, other parts of current collectors 160 (not shown in FIG. 2) may support active material layers 150 that are parts of electrochemical cell 100. Typically, the connections among current collectors are performed in parts of electrodes that are positioned away from active material layers.

Specifically, first current collector 160a, second current collector 160b, and third current collector 160c form current collector stack 169 away from active material layers 150. First current collector 160a comprises first metal layer 161a, first additional metal layer 162a, and first polymer base 170a positioned between and supporting both first metal layer 161a and first additional metal layer 162a. Similarly, second current collector 160b comprises second metal layer 161b, second additional metal layer 162b, and second polymer base 170b positioned between and supporting both second metal layer 161b and second additional metal layer 162b. Finally, third current collector 160c comprises third metal layer 161c, third additional metal layer 162c, and third polymer base 170c positioned between and supporting both third metal layer 161c and third additional metal layer 162c. Second current collector 160b is positioned between first current collector 160a and third current collector 160c such that first additional metal layer 162a directly interfaces with second metal layer 161b and such that second additional metal layer 162b directly with interfaces third metal layer 161c. In this view and example, first additional metal layer 162a and second metal layer 161b are interconnected through the first direct interface. Similarly, second additional metal layer 162b and third metal layer 161c are interconnected through the second direct interface. However, first metal layer 161a remains isolated from all other layers. Furthermore, second metal layer 161b and second additional metal layer 162b remains isolated from each other. Finally, third additional metal layer 162c remains isolated from all other layers.

Referring to FIG. 2A, second current collector 160b comprises second-collector contact opening 168b, which allows protruding other components through to form electrical connections. In some examples, second-collector contact opening 168 has a width that is smaller than the thickness of second current collector 160b. In other words, the aspect ratio (width-to-height or a ratio of the dimension in the Y-direction to the dimension in the Z-direction) of second-collector contact opening 168 is at least about 1 or, more specifically, at least about 5, at least about 20, or even at least about 100. In one example, a current collector has a total thickness of about 8 micrometers, while the contact openings can be 3 millimeters in diameter (e.g., for round holes) or 3 millimeters by 22.5 millimeters (e.g., for rectangular holes). This is just one example to illustrate the aspect ratio. Other dimensions (e.g., current collector thicknesses and hole opening sizes) are also within the scope. A large aspect ratio simplifies the process of protruding first current collector 160a and/or third current collector 160c into second-collector contact opening 168. Specifically, first current collector 160a and/or third current collector 160c may bend out-of-plane to protrude into second-collector contact opening 168. In the same or other examples, a portion of the total area, occupied by contact openings in one current collector is between 1% and 50% or, more specifically, between 2% and 10% for small 1-2 mm holes or between 20% and 50% for large rectangular sections of weld areas.

Figure 2B:
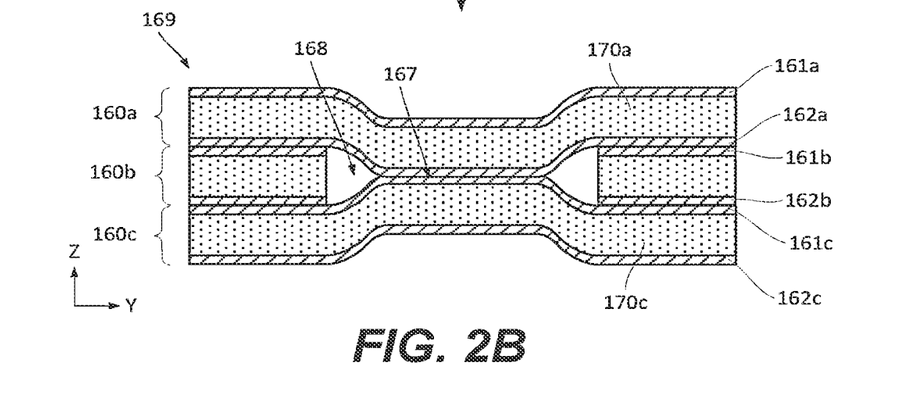
FIG. 2B is a schematic cross-sectional side view of the stack formed by the three current collectors in FIG. 2A after interconnecting some of the metal layers of these current collectors, in accordance with some examples.

Referring to FIG. 2B, at least one of first current collector 160a and third current collector 160c protrude into second-collector contact opening 168 and form through-second-collector contact interface 167b between first additional metal layer 162a and third metal layer 161. This through-second-collector contact interface 167b directly interconnects first additional metal layer 162a and third metal layer 161 but also indirectly interconnects second metal layer 161b and second additional metal layer 162b. While FIG. 2B illustrates both first current collector 160a and third current collector 160c protruding into second-collector contact opening 168, other examples, in which only one of first current collector 160a and third current collector 160c protrudes into second-collector contact opening 168, are also within the scope. Furthermore, in some examples, a separate conductive object (different from first current collector 160a and third current collector 160c) is inserted into second-collector contact opening 168 to establish through-second-collector contact interface 167b. This separate conductive object can be a filler (e.g., having a thickness similar (within 50% or even more specifically within 25%) to the thickness of second current collector 160b), solder, and/or other like structure configured to occupy the gap formed by second-collector contact opening 168. Using a separate conductive object reduces the need to bend one or both of first current collector 160a and third current collector 160c, which may generate stresses within current collector stack 169.

In some examples, through-second-collector contact interface 167b is formed by welding (e.g., ultrasonic) first additional metal layer 162a and third metal layer 161c, e.g., forming an ultrasonic welding interface. This welding can be performed such that through first current collector 160a and third current collector 160c such that the corresponding polymer bases (i.e., first polymer base 170a and thirds polymer base 170c) are preserved, e.g., as shown in FIG. 2B. Preserving first polymer base 170a helps to maintain the electrical isolation of first metal layer 161a and first additional metal layer 162a. Similarly, preserving third polymer base 170c helps to maintain the electrical isolation of third metal layer 161c and third additional metal layer 162c. Alternatively, first polymer base 170a can collapse while forming through-second-collector contact interface 167b thereby interconnecting first metal layer 161a and first additional metal layer 162a.

Figure 2C:
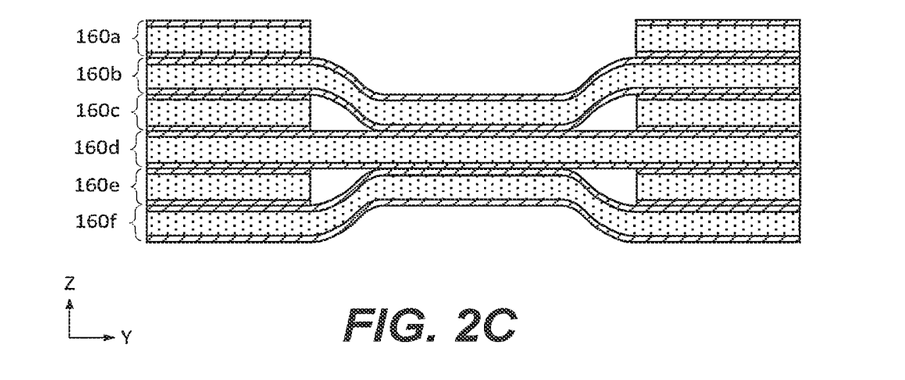
FIG. 2C is a schematic cross-sectional side view of another example of the stack after interconnecting some of the metal layers of the current collectors for this stack, in accordance with some examples.

Referring to the example in FIG. 2B, first metal layer 161a and first additional metal layer 162a and, separately, third metal layer 161c and third additional metal layer 162c remain isolated when through-second-collector contact interface 167b is formed. Similar interfaces can be formed through first polymer base 170a and thirds polymer base 170c to interconnect these layers as will now be described with reference to FIG. 3A. For example, electrochemical cell 100 or, more specifically, current collector stack 169 can comprise metal layer 180a and/or additional metal layer 180b. In general, any number of contact openings can be used to form connections in stacks containing any number of current collectors. Contact openings can be arranged in various patterns. In some examples, two or more contact openings can be positioned over each other (e.g., concentric to each other) to form contact interfaces at different layers as, e.g., is schematically shown in FIG. 2C. Furthermore, the same two metal layers can be interconnected at different locations, e.g., to ensure uniform current distribution.

Figure 3A:
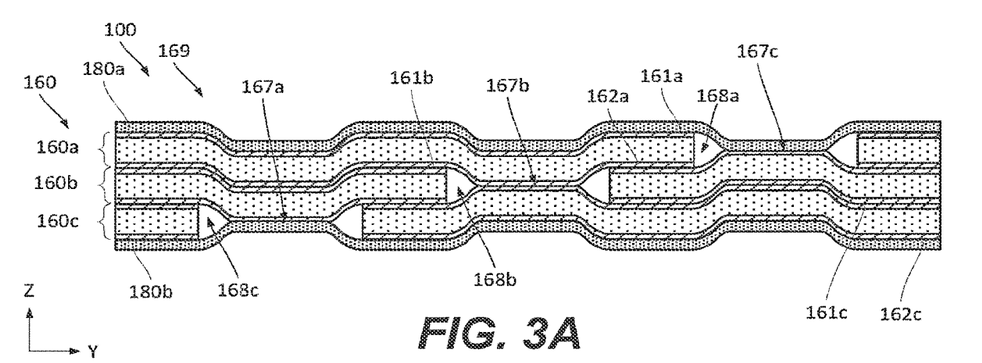
FIG. 3A is a schematic cross-sectional side view of the stack formed by three current collectors in which all metal layers of these current collectors are interconnected, in accordance with some examples.

As shown in FIG. 3A, metal layer 180a directly interfaces first metal layer 161a such that first current collector 160a is positioned between metal layer 180a and second current collector 160b. First current collector 160a comprises first-collector contact opening 168a with at least one of metal layer 180a and second current collector 160b protruding into first-collector contact opening 168a and forming through-first-collector contact interface 167a between metal layer 180a and second metal layer 161b thereby indirectly interconnecting first metal layer 161a and first additional metal layer 162a. Various aspects of forming through-secondcollector contact interface 167*b* (described above) are applied to through-first-collector contact interface 167*a*.

Also referring to FIG. 3A, additional metal layer 180*b* directly interfaces third additional metal layer 162*c* such that third current collector 160*c* is positioned between additional metal layer 180*b* and second current collector 160*b*. Third current collector 160*c* comprises third-collector contact opening 168*c* with at least one of additional metal layer 180*b* and second current collector 160*b* protruding into third-collector contact opening 168*c* and forming through-third-collector contact interface 167*c* between additional metal layer 180*b* and second additional metal layer 162*b* thereby indirectly interconnecting third metal layer 161*c* and third additional metal layer 162*c*. Various aspects of forming through-second-collector contact interface 167*b* (described above) are applied to through-third-collector contact interface 167*c*.

Metal layer 180*a* and additional metal layer 180*b* can be standalone structures (e.g., as shown in FIG. 3A) or can be parts of additional current collectors. When metal layer 180*a* is a standalone structure, the surface of metal layer 180*a* facing away from first current collector 160*a* can be at least partially exposed, e.g., available for making electric connections. In some examples, metal layer 180*a* is a tab extending away from current collector stack 169 and forming an external connection to current collector stack 169. Alternatively, metal layer 180*a* is a part of an additional current collector, forming current collector stack 169 together with first current collector 160*a*, second current collector 160*b*, and third current collector 160*c*.

Overall, first metal layer 161*a* and third additional metal layer 162*c* can be interconnected using a combination of through-first-collector contact interface 167*a* extending through first-collector contact opening 168*a*, through-first-collector contact interface 167*b* extending through first-collector contact opening 168*b*, and through-third-collector contact interface 167*b* extending through third-collector contact opening 168*c*. In some examples, contact openings and corresponding contact interfaces form patterns. For example, openings through different current collectors can be aligned along the stacking axis, e.g., as schematically shown in FIG. 2C. In some examples, such holes are offset.

Figure 3B:
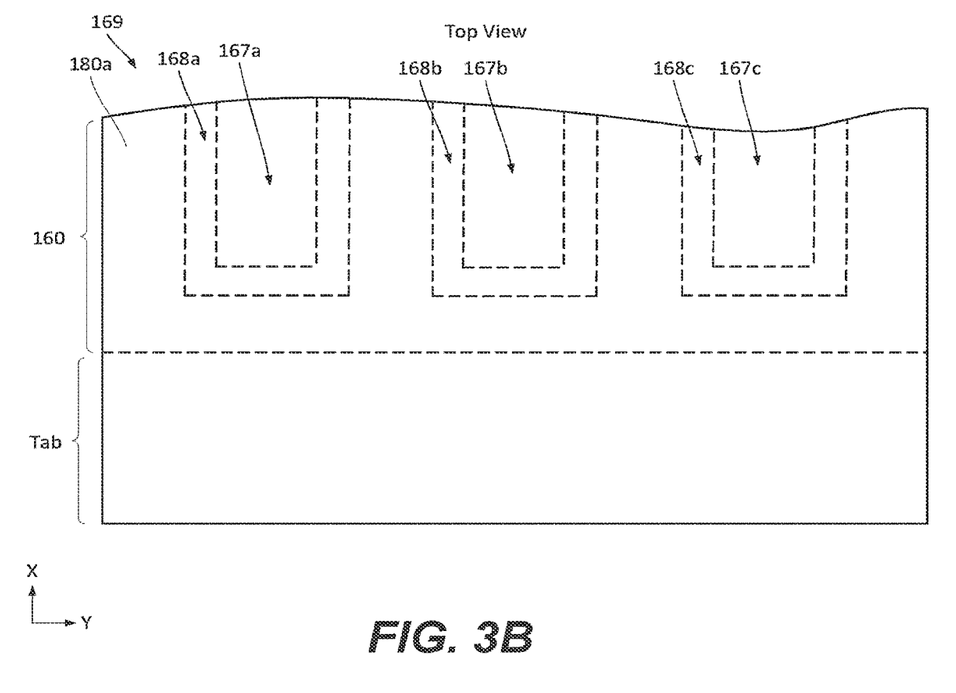
FIG. 3B is a schematic top view of the stack in FIG. 3A, which illustrates the footprints of the contact openings and contact interfaces, in accordance with some examples.

Referring to FIG. 3B, in some examples, metal layer 180*a* and additional metal layer 180*b* extend beyond current collector stack 169 and can be operable as tabs. These tabs can be connected to cell terminals. These tabs, in combination with various contact interfaces, eliminate the need to make connections to the metal layers of the current collectors, forming the stack.

In some examples, electrochemical cell 100 is a lithium metal cell. In more specific examples, each active material layer 150 comprises lithium metal. In these examples, a combination of current collectors 160 and one or two active material layers 150 for a negative electrode. As noted above, the metal layers of each current collector 160 can be also formed from lithium metal. Alternatively, these metal layers are formed from other materials, e.g., copper. More specifically, each of first metal layer 161*a*, first additional metal layer 162*a*, second metal layer 161*b*, second additional metal layer 162*b*, third metal layer 161*c*, and third additional metal layer 162*c* comprises copper.

In some examples, each active material layer 150 comprises positive active material structures and a polymer binder. In these examples, a combination of current collectors 160 and one or two active material layers 150 for a positive electrode. Furthermore, in some examples, each of first metal layer 161*a*, first additional metal layer 162*a*, second metal layer 161*b*, second additional metal layer 162*b*, third metal layer 161*c*, and third additional metal layer 162*c* comprises aluminum.

Figure 4A:
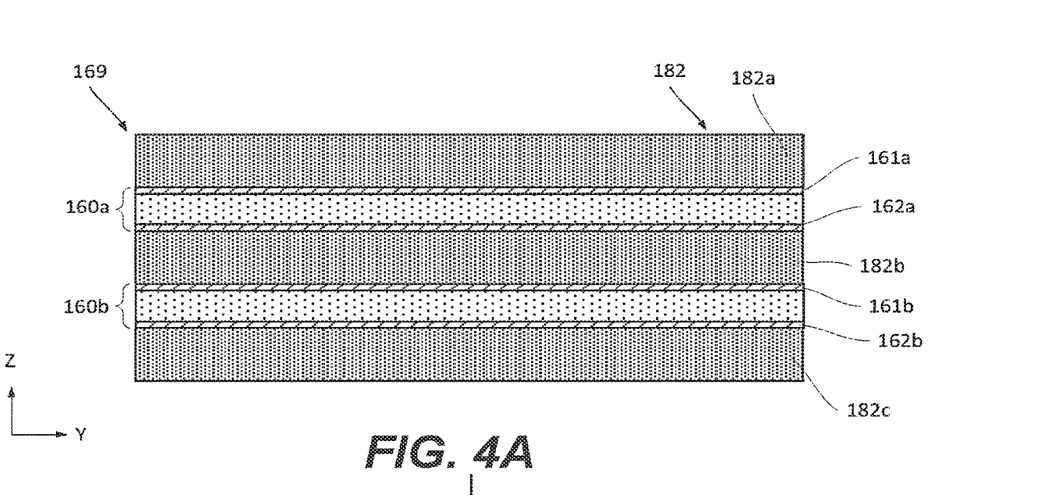
FIG. 4A is a schematic cross-sectional side view of the stack formed by two current collectors and three metal sheets before interconnecting the metal layers of these current collectors, in accordance with some examples.
Figure 4B:
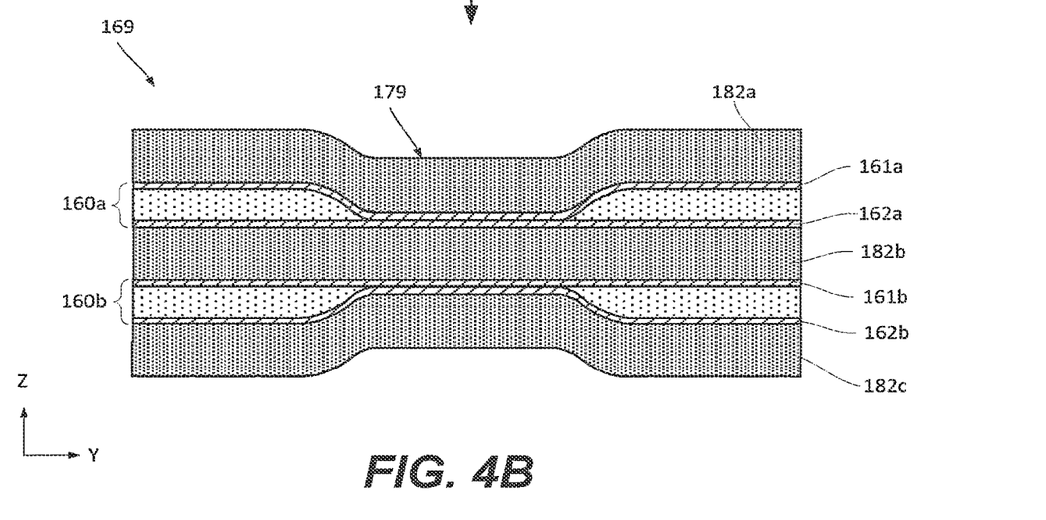
FIG. 4B is a schematic cross-sectional side view of the stack formed by the current collectors in FIG. 4A after interconnecting some of the metal layers of these current collectors, in accordance with some examples.

FIGS. 4A and 4B illustrate another example of current collector stack 169 before and after interconnecting the metal layers of different current collectors 160. Specifically, first current collector 160*a* and second current collector 160*b* form current collector stack 169, e.g., away from active material layers 150. As shown, first current collector 160*a* comprises first metal layer 161*a*, first additional metal layer 162*a*, and first polymer base 170*a* positioned between and supporting both first metal layer 161*a* and first additional metal layer 162*a*. Second current collector 160*b* comprises second metal layer 161*b*, second additional metal layer 162*b*, and second polymer base 170*b* positioned between and supporting both second metal layer 161*b* and second additional metal layer 162*b*. The assembly also comprises metal sheets 182, such as first metal sheet 182*a*, second metal sheet 182*b*, and third metal sheet 182*c*, which may Specifically, first current collector 160*a* is positioned between first metal sheet 182*a* and second metal sheet 182*b* such that first metal layer 161*a* directly interfaces with first metal sheet 182*a* and such that first additional metal layer 162*a* directly interfaces with second metal sheet 182*b*. Furthermore, second current collector 160*b* is positioned between second metal sheet 182*b* and third metal sheet 182*c* such that second metal layer 161*b* directly interfaces with second metal sheet 182*b* and such that second additional metal layer 162*b* directly interfaces with third metal sheet 182*c*.

Referring to FIG. 4A and before interconnecting the metal layers, first polymer base 170*a* positioned between and separates first metal layer 161*a* and first additional metal layer 162*a*. Similarly, second polymer base 170*b* positioned between and separates second metal layer 161*b* and second additional metal layer 162*b*. Referring to FIG. 4B and after interconnecting the metal layers, first metal sheet 182*a*, first metal layer 161*a*, first additional metal layer 162*a*, second metal sheet 182*b*, second metal layer 161*b*, second additional metal layer 162*b*, and third metal sheet 182*c* form interconnected stack 179 such that first polymer base 170*a* and second polymer base 170*b* do not extend through interconnected stack 179. Specifically, when interconnected stack 179 is formed, first polymer base 170*a* is pushed from the space between first metal layer 161*a* and first additional metal layer 162*a* allowing first metal layer 161*a* to interface first additional metal layer 162*a*. First metal sheet 182*a* helps to preserve the integrity of first metal layer 161*a* while forming interconnected stack 179. Similarly, second metal sheet 182*b* helps to preserve the integrity of first additional metal layer 162*a* as well as second metal layer 161*b* while forming interconnected stack 179. Finally, third metal sheet 182*c* helps to preserve the integrity of second additional metal layer 162*b* while forming interconnected stack 179. Even if the integrity of one or more metal layers is disrupted, corresponding metal sheets can help to ensure circuit continuity.

In some examples, all metal layers and metal sheets are formed from the same materials (e.g., copper, aluminum). Alternatively, metal layers may be formed from one material (e.g., copper, aluminum), while metal sheets are formed from a different material (e.g., nickel). The thickness of each metal sheet can be between 4 micrometers and 15 micrometers or, more specifically, between 6 micrometers and 12 micrometers. Examples of the metal layer thickness are presented above.

In some examples, first metal sheet 182a, first metal layer 161a, first additional metal layer 162a, second metal sheet 182b, second metal layer 161b, second additional metal layer 162b, and third metal sheet 182c are welded together in interconnected stack 179.

Method Examples

Methods of fabricating electrochemical cell 100 depend on the cell design and different approaches to forming electrical connections among metal layers of current collectors described above with reference to FIGS. 2A-2C and FIGS. 4A-4B. For example, the connections between metal layers can be formed using an opening using an opening within this current collector and two adjacent current collectors, e.g., as schematically shown in FIGS. 2A-2B. In another example, the connections between metal layers can be formed by forcing a portion of the polymer base and bring these metal layers together to form an interface, e.g., as shown in FIGS. 4A-4B. Additional fabrication aspects will now be described in more detail.

Figure 5A:
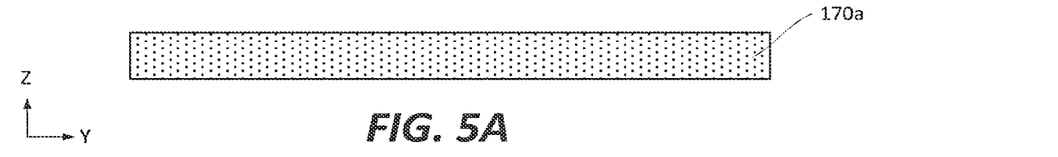
FIGS. 5A-5E are schematic illustrations of different stages of fabricating a current collector with interconnected metal layers, in accordance with some examples.
Figure 5B:
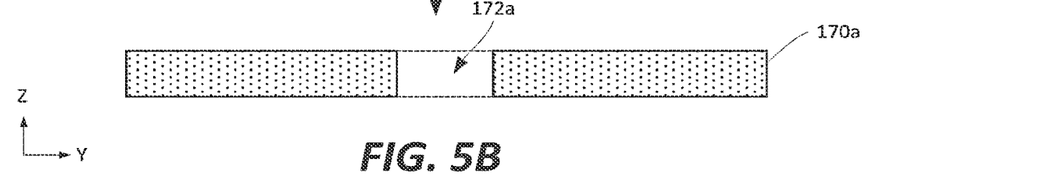
Figure 5C:
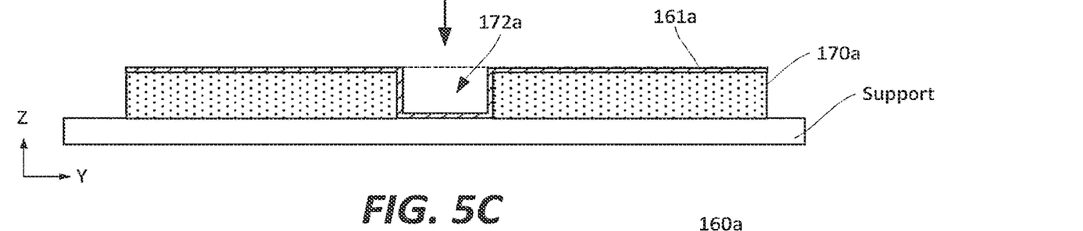
Figure 5D:
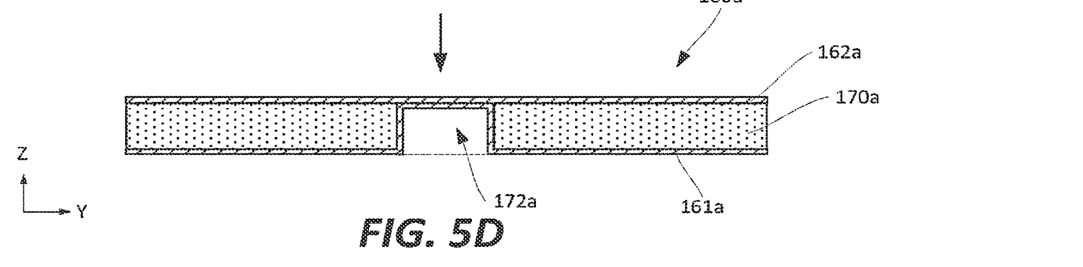
Figure 5E:
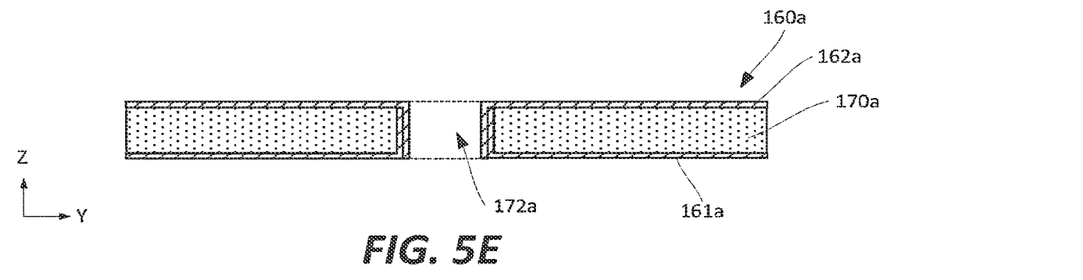

Referring to FIGS. 5A-5E, in some examples, first polymer base 170a is provided without any metal layers, e.g., as shown in FIG. 5A. Base opening 172a is then formed (e.g., cut or perforated) in first polymer base 170a, e.g., as shown in FIG. 5B. Thereafter, first polymer base 170a receives first metal layer 161a, e.g., using physical vapor deposition (PVD) or other like processes. A portion of first metal layer 161a extends into base opening 172a, e.g., as shown in FIG. 5C. During this operation, a support can be used for used to provide a surface for supporting first polymer base 170a and, in some examples, a portion of first metal layer 161a. The process proceeds with depositing first additional metal layer 162a on the opposite side of first polymer base 170a such that first metal layer 161a and first additional metal layer 162a directly interface each other, e.g., as shown in FIG. 5D or FIG. 5E. At this point, first current collector 160a is formed with first metal layer 161a and first additional metal layer 162a in the interconnected form. The difference between examples in FIG. 5D or FIG. 5E depends on the size and shape of base opening 172a, the thicknesses of first metal layer 161a and first additional metal layer 162a, and other factors. In some examples, first metal layer 161a and first additional metal layer 162a form a plug within base opening 172a or are combined with another component to collectively form this plug. This metal-layer interconnection example could be used as an alternative to or as an addition to FIGS. 2A-2C and FIGS. 4A-4B.

FIGS. 6A-6D illustrate another example where active material layer 150 can be used for interconnecting metal layers of composite current collectors (i.e., current collectors with polymer bases separating these metal layers). This example applies to lithium metal being used as active material layer 150 with interconnected metal layers being, e.g., copper. In other words, this example is applicable to negative active material layers in lithium-metal cells. This example may not be applicable to positive active material layers and/or lithium-ion cells (wherein negative active material layers comprise graphite, silicon, and other like materials). When composite current collectors are used for such electrodes (positive electrodes in lithium-metal cells or lithium-ion cells as well as negative electrodes in lithium-ion cells), the metal layers will be interconnected in other areas away from active material layers.

Figure 6A:
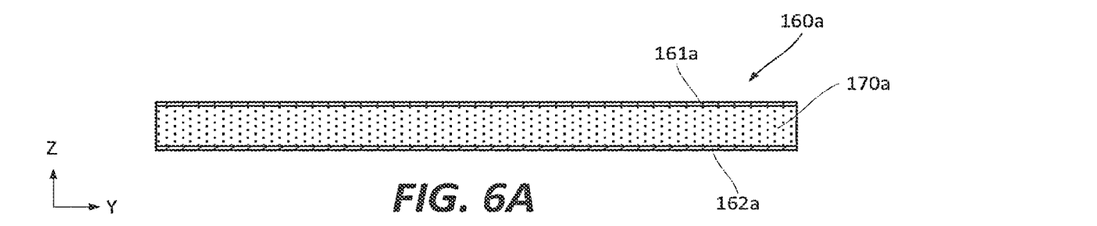
FIGS. 6A-6D are schematic illustrations of different stages of fabricating an electrode with metal layers interconnected by active material layers, in accordance with some examples.
Figure 6B:
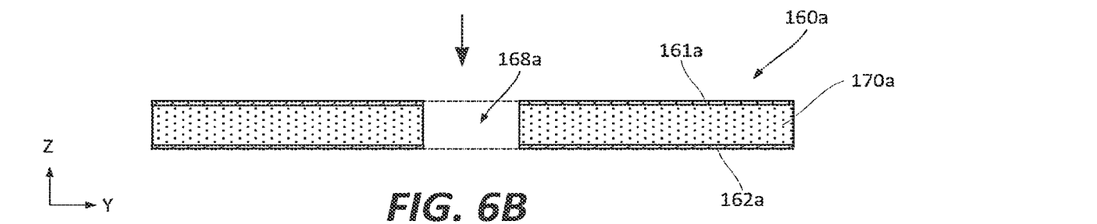
Figure 6C:
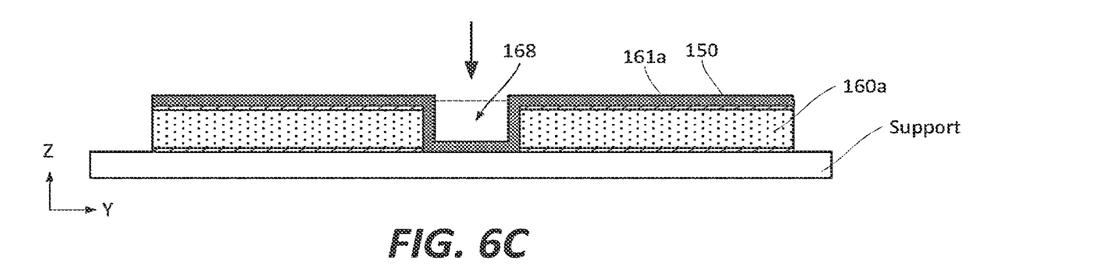
Figure 6D:
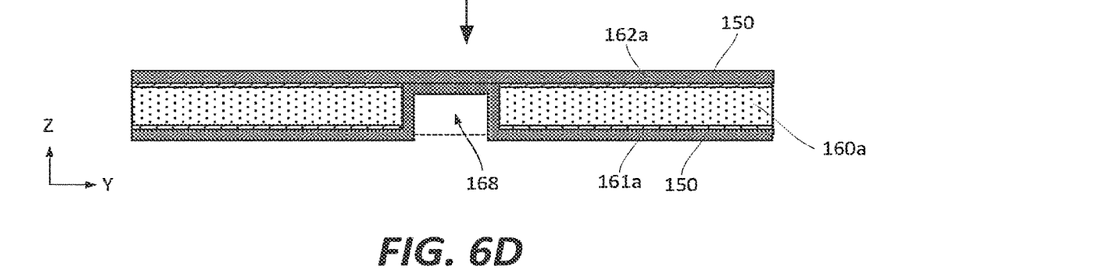

Referring to FIGS. 6A-6D, in some examples, first current collector 160a is provided with first metal layer 161a and first additional metal layer 162a positioned on different sides of polymer base 170a and not connected, e.g., as shown in FIG. 6A. The process proceeds with forming first-collector contact opening 168a, e.g., as shown in FIG. 6B. First-collector contact opening 168a extends through all layers of first current collector 160a. The process proceeds with forming active material layer 150 over first metal layer 161a such that a portion of this active material layer 150 extends into first-collector contact opening 168a, e.g., as shown in FIG. 6C. Thereafter, another active material layer 150 is formed over first additional metal layer 162a such that the two active material layers 150 interface each other e.g., as shown in FIG. 6D. This metal-layer interconnection example could be used as an alternative to or as an addition to FIGS. 2A-2C and FIGS. 4A-4B.

In some examples, first-collector contact opening 168a can be formed in first current collector 160a while active material layers 150 are already present on and supported by first current collector 160a. In some examples (e.g., active material layers 150 are formed from lithium metal), first-collector contact opening 168a can also extend through active material layers 150. In other examples (e.g., active material layers 150 comprise positive active materials), active material layers 150 are spaced away from first-collector contact opening 168a such that a portion of first current collector 160a around first-collector contact opening 168a is exposed. The connection between first current collector 160a and one or more other current collectors could be formed with various methods described elsewhere in this description.

In some examples, first-collector contact opening 168a is formed while forming (e.g., roll notching from a continuous web) the boundaries of first current collector 160a. These forming operations may be performed using die cutting, laser cutting, or other like techniques. This approach simplifies referencing of first-collector contact opening 168a to the edges of first current collector 160a. During this operation, first current collector 160a may or may not have active material layers 150. In some examples, electrodes are moved from a notching machine to a magazine (e.g., to a feed stacker). Alternatively, notching and stacking are performed on different same machines at different times (e.g., boundary notching is performed before forming contact openings). For example, contact openings can be formed while electrodes are positioned on an alignment table or, more generally, any anytime before stacking.

Overall, contact openings can be formed at any step in the overall electrode preparation process, up until stacking. This opening-forming operation generally does not interfere with other electrode fabrication operations. It should be noted that the alternating nature of the contact openings (e.g., as shown in FIG. 2A) prevents the possibility of punching once the full stack has been completed.

The opening-forming operation can involve one or more of the following operations: (a) die-cutting/hole punching, (b) laser cutting, and (c) laser perforation. For example, during die-cutting/hole punching, a physical die would puncture through the material with the desired dimension, leaving the space empty. This approach is suitable for openings larger than about 1 millimeter in size (e.g., in diameter/width). Laser cutting uses a laser beam to cut the outline of the desired dimension, leaving behind an opening. Leftover materials are extracted from the opening thereafter. This approach is suitable for openings larger than 1 millimeter in diameter/width. Finally, laser perforation uses a single-spot laser pulse for melting a hole through the material in a single spot. This approach can be used for smaller size openings, e.g., less than about 1 millimeter, with removed materials simply being vaporized, rather than leaving any leftovers within the formed openings.

As noted above with reference to FIGS. 4A and 4B, in addition to or instead of adding contact openings, metal sheets can be provided within a stack formed by current collectors to provide reinforcement and ensure electrical continuity. These metal sheets can be referred to as interleaf sheets, and these sheets can be added at various steps during the overall fabrication process as will now be described with reference to FIG. 7.

Figure 7:
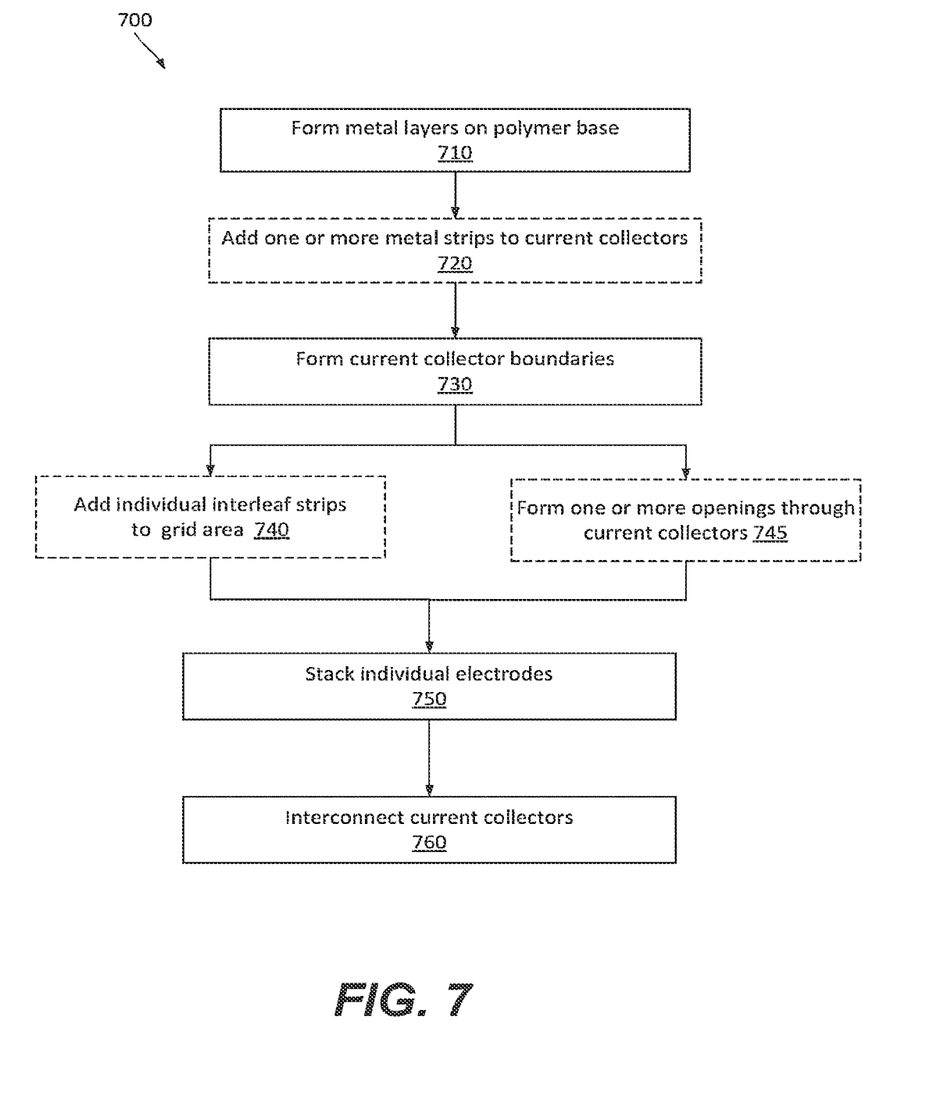
FIG. 7 is a process flowchart corresponding to a method of interconnecting the metal layers of stacked current collectors, in accordance with some examples.

Referring to FIG. 7, method 700 comprises (block 710) forming metal layers on a polymer base (e.g., first metal layer 161a and first additional metal layer 162a on first polymer base 170a). For example, PVD can be used for this operation. The composition of the metal layers depends on the use of this current collector, e.g., aluminum can be used for metal layers when the current collector is used to fabricate a positive electrode, while copper is used when the current collector is used to fabricate a negative electrode.

In some examples, method 700 comprises (block 720) adding one or more metal strips to the current collectors, which is an optional operation. This metal strip can be referred to as a ribbon. This ribbon can overlap the existing metal layer of the current collector and can be used to enhance the metal layer during welding (e.g., as shown in FIGS. 4A and 4B) and/or other operations. In other words, the ribbon is operable as an interleaf.

In some examples, method 700 comprises (block 730) forming current collector boundaries, e.g., notching a roll into individual current collector sheets. At this stage, the current collector sheets may already include active material layers. In other words, the notched components are actual electrodes ready for stacking.

In some examples, method 700 comprises (block 740) adding individual interleaf strips to the grid area after the electrodes are notched (e.g., as shown in FIG. 4A), which is an optional operation. For example, a pick-and-place tool can be used for this operation. Alternatively, method 700 comprises (block 745) forming one or more openings through the current collectors (e.g., as shown in FIGS. 2A), which also an optional operation.

In some examples, method 700 comprises (block 750) staking individual electrodes, e.g., by moving individual electrodes from an alignment station to a stacking station. Again, a pick-and-place tool can be used for this operation. A separator can be also introduced during this operation. In more specific examples, an interleaf is introduced during this operation.

Finally, method 700 comprises (block 760) interconnecting current collectors of corresponding electrodes, e.g., all current collectors of all positive electrodes and, separately, all current collectors of all negative electrodes. Various types of welding (e.g., ultrasonic welding, laser welding, resistance welding) can be used for this operation.

Application Examples

Electrochemical cell 100, e.g., lithium-metal cell, described herein, can be used for various applications, such as ground-based vehicles, boats, aircraft, and spacecraft. For example, aircraft and/or spacecraft use Li-metal batteries as such batteries have significantly higher gravimetric energy density than, e.g., Li-ion batteries. Both aircraft and spacecraft applications require lower mass cells, as additional mass leads to lower payload capacity. Forse applications to utilize the maximum amount of their designed capacity, the energy system must be the lowest mass possible. In addition, safety is paramount in both of these applications, as onboard fires while in flight could be mission-critical and cause catastrophic failure of the system. In this scenario, occupants or personnel using the system are not able to simply depart from aircraft and/or spacecraft (e.g., in comparison to ground-based vehicles).

Figure 8:
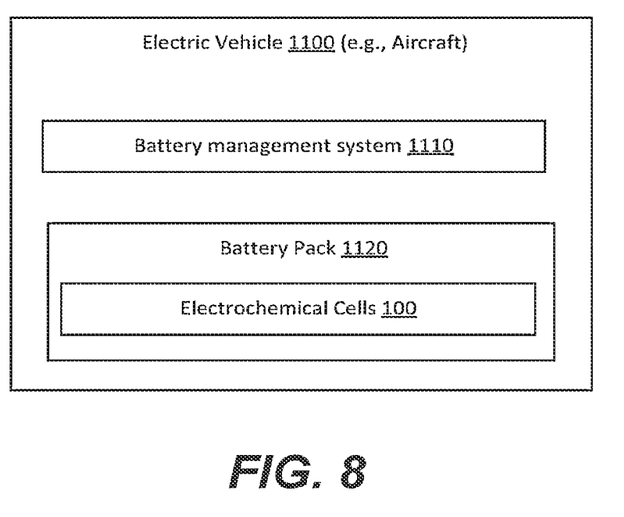
FIG. 8 is a block diagram of an electric vehicle comprising one or more electrochemical cells, described herein.

FIG. 8 is a block diagram of electric vehicle 1100 (e.g., aircraft) comprising battery pack 1120, which in turn comprises one or more electrochemical cells 100. Electric vehicle 1100 also comprises battery management system 1110, electrically and communicatively coupled to battery pack 1120. For example, multi-cell assembly 190 can receive various operating signals from battery pack 1120, such as state of charge, temperature, voltage, current, and the like.

Experimental Results

Figure 9:
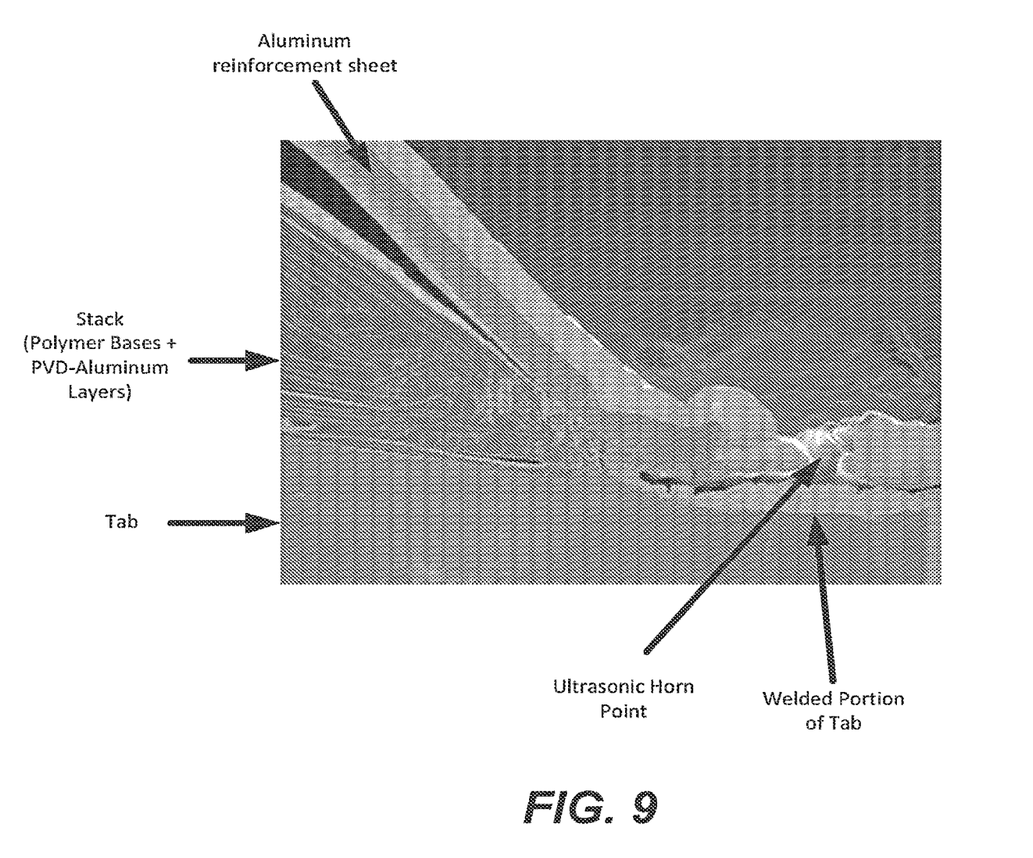
FIG. 9 is a scanning electron microscope (SEM) image of a weld zone formed by two current collectors.

Multiple tests were conducted to interconnect metal layers separated by polymer bases. Specifically, each tested current collector had two metal layers separated by a polymer base. One test involved using an aluminum reinforced sheet over a stack comprising current collectors, each having a polymer base and aluminum metal lat forming an opening in one such current collector and welding two other current collectors, positioned on different sides of the current collector with the opening, similar to FIGS. 4A-4B. The results of this test are presented in FIG. 9, which is a scanning electron microscope (SEM) image of the weld zone. Different components are identified in this figure.

Conclusion

Although the foregoing concepts have been described in some detail for purposes of clarity of understanding, it will be apparent that certain changes and modifications may be practiced within the scope of appended claims. It should be noted that there are many alternative ways of implementing processes, systems, and apparatuses. Accordingly, present embodiments are to be considered illustrative and not restrictive.

What is claimed is:

1. An electrochemical cell comprising:
   a plurality of active material layers; and
   a plurality of current collectors, partially interfacing and supporting the plurality of active material layers and comprising a first current collector, a second current collector, and a third current collector that form a current collector stack away from the plurality of active material layers, wherein:
   the first current collector comprises a first metal layer, a first additional metal layer, and a first polymer base positioned between and supporting both the first metal layer and the first additional metal layer,
   the second current collector comprises a second metal layer, a second additional metal layer, and a second polymer base positioned between and supporting both the second metal layer and the second additional metal layer,
   the third current collector comprises a third metal layer, a third additional metal layer, and a third polymer base positioned between and supporting both the third metal layer and the third additional metal layer,
   the second current collector is positioned between the first current collector and the third current collector such that the first additional metal layer directly interfaces with the second metal layer and such that the second additional metal layer directly interfaces with the third metal layer, and the second current collector comprises a second-collector contact opening with at least one of the first current collector and the third current collector protruding into the second-collector contact opening and forming a through-second-collector contact interface between the first additional metal layer and the third metal layer thereby indirectly interconnecting the second metal layer and the second additional metal layer.

2. The electrochemical cell of claim 1, wherein the through-second-collector contact interface is formed by welding the first additional metal layer and the third metal layer.

3. The electrochemical cell of claim 1, wherein both the first current collector and the third current collector protrude into the second-collector contact opening.

4. The electrochemical cell of claim 1, wherein the second-collector contact opening has a width that is smaller than a thickness of the second current collector.

5. The electrochemical cell of claim 1, further comprising a metal layer directly interfacing the first metal layer such that the first current collector is positioned between the metal layer and the second current collector, wherein the first current collector comprises a first-collector contact opening with at least one of the metal layer and the second current collector protruding into the first-collector contact opening and forming a through-first-collector contact interface between the metal layer and the second metal layer thereby indirectly interconnecting the first metal layer and the first additional metal layer.

6. The electrochemical cell of claim 5, wherein the metal layer is a standalone structure such that a surface of the metal layer facing away from the first current collector is at least partially exposed.

7. The electrochemical cell of claim 6, wherein the metal layer is a tab extending away from the current collector stack and forming an external connection to the current collector stack.

8. The electrochemical cell of claim 5, wherein the metal layer is a part of an additional current collector, forming the current collector stack together with the first current collector, the second current collector, and the third current collector.

9. The electrochemical cell of claim 1, wherein the first metal layer and the third additional metal layer are interconnected using a combination of a through-first-collector contact interface extending through a first-collector contact opening, the through-first-collector contact interface extending through the first-collector contact opening, and a through-third-collector contact interface extending through a third-collector contact opening.

10. The electrochemical cell of claim 1, wherein the electrochemical cell is a lithium metal cell.

11. The electrochemical cell of claim 10, wherein each of the plurality of active material layers comprises lithium metal.

12. The electrochemical cell of claim 11, wherein each of the first metal layer, the first additional metal layer, the second metal layer, the second additional metal layer, the third metal layer, and the third additional metal layer comprises copper.

13. The electrochemical cell of claim 10, wherein each of the plurality of active material layers comprises positive active material structures and a polymer binder.

14. The electrochemical cell of claim 13, wherein each of the first metal layer, the first additional metal layer, the second metal layer, the second additional metal layer, the third metal layer, and the third additional metal layer comprises aluminum.

15. The electrochemical cell of claim 1, wherein the thickness of each of the first metal layer and the first additional metal layer is at least 5 times smaller than the thickness of the first polymer base.

16. The electrochemical cell of claim 15, wherein:

the thickness of each of the first metal layer and the first additional metal layer is less than 2 micrometers, and the thickness of the first polymer base is at least 5 micrometers.

17. The electrochemical cell of claim 1, wherein each of the first polymer base, the second polymer base, and the third polymer base comprises one or more of polyethylene terephthalate, polypropylene, polycarbonate, polyethylene, polyimide, ceramic-based polymer, cellulose, nylon, and a polyolefin.

* * * * *